United States Patent
Kravtsov (10) Patent No.: US 9,615,326 B2
(45) Date of Patent: Apr. 4, 2017

(54) SYSTEM AND METHOD OF IMPROVING POWER EFFICIENCY IN WIRELESS COMMUNICATION SYSTEM

(75) Inventor: Vladimir Kravtsov, Jerusalem (IL)

(73) Assignee: INTEL CORPORATION, Santa Clara, CA (US)

( * ) Notice: Subject to any disclaimer, the term of this patent is extended or adjusted under 35 U.S.C. 154(b) by 1340 days.

(21) Appl. No.: 13/172,944

(22) Filed: Jun. 30, 2011

(65) Prior Publication Data

US 2013/0003627 A1  Jan. 3, 2013

(51) Int. Cl.
- G08C 17/00 (2006.01)
- H04B 1/10 (2006.01)
- H04W 52/02 (2009.01)
- H04L 25/03 (2006.01)

(52) U.S. Cl.
CPC ... H04W 52/0209 (2013.01); H04L 25/03057 (2013.01); Y02B 60/50 (2013.01)

(58) Field of Classification Search
USPC ....... 375/261, 350, 229, 296, 346, 316, 260, 375/297, 295, 318, 349, 220, 267, 299, 375/340; 376/313; 455/127.1, 208, 455/552.1, 114.2, 114.3, 39, 406, 553.1, 455/63.1, 69; 370/208, 210, 311
See application file for complete search history.

(56) References Cited

U.S. PATENT DOCUMENTS

| | | | | |
|---|---|---|---|---|
| 4,561,012 A | * | 12/1985 | Acampora | 348/612 |
| 5,241,538 A | * | 8/1993 | Kanno et al. | 370/201 |
| 5,880,687 A | * | 3/1999 | May | H04L 27/0002 341/61 |
| 6,130,916 A | * | 10/2000 | Thomson | 375/285 |
| 6,300,895 B1 | * | 10/2001 | Carrara et al. | 342/55 |
| 8,130,863 B2 | * | 3/2012 | Han | H04L 5/0007 375/260 |
| 8,654,891 B2 | * | 2/2014 | Kawasaki | 375/296 |
| 2003/0142754 A1 | * | 7/2003 | Jung et al. | 375/260 |
| 2004/0101062 A1 | * | 5/2004 | Lindh | H04L 27/36 375/261 |
| 2006/0067426 A1 | * | 3/2006 | Maltsev | H04L 27/2602 375/297 |
| 2007/0121483 A1 | * | 5/2007 | Zhang et al. | 370/208 |
| 2008/0207143 A1 | * | 8/2008 | Skarby | H04B 1/0475 455/103 |
| 2008/0260054 A1 | | 10/2008 | Myung et al. | |
| 2009/0323857 A1 | * | 12/2009 | Singh | H04L 27/2624 375/297 |
| 2010/0085955 A1 | * | 4/2010 | Luo | H04B 7/0667 370/344 |

(Continued)

FOREIGN PATENT DOCUMENTS

KR     20040054827     *  6/2004     ............. H04J 13/18

OTHER PUBLICATIONS

International Search Report received for PCT Patent Application No. PCT/US2012/044720, mailed Feb. 1, 2013, 11 pages.

*Primary Examiner* — Phuongchau Ba Nguyen (57) ABSTRACT

An apparatus may comprise a signal mapper to map a pre-emphasized signal to sub-carriers symmetrically about DC, and a peak-to-average-power reduction (PAPR) module arranged to receive a pre-emphasized signal and treat the pre-emphasized signal so as to reduce PAPR in a transmit signal sent from the transmitter. Other embodiments are described and claimed.

14 Claims, 7 Drawing Sheets

(56) References Cited

U.S. PATENT DOCUMENTS

| | | |
|---|---|---|
| 2010/0093304 A1* | 4/2010 | Miyoshi et al. ............ 455/404.1 |
| 2010/0105338 A1* | 4/2010 | Wang .................... H03F 1/3241 |
| | | 455/73 |
| 2010/0135421 A1* | 6/2010 | Jung et al. ..................... 375/260 |
| 2010/0166089 A1* | 7/2010 | Seki .............................. 375/260 |
| 2010/0220710 A1* | 9/2010 | Sugawara et al. ............ 370/350 |
| 2011/0064162 A1 | 3/2011 | McCallister et al. |
| 2011/0075745 A1 | 3/2011 | Kleider et al. |
| 2011/0086645 A1* | 4/2011 | Choi et al. ................. 455/452.1 |
| 2011/0092173 A1* | 4/2011 | McCallister et al. ......... 455/108 |
| 2012/0076250 A1* | 3/2012 | Kravtsov ...................... 375/350 |
| 2013/0003627 A1* | 1/2013 | Kravtsov ...................... 370/311 |

* cited by examiner

| Channel BW (RB) | Allocated BW (RB) | LTE: ACLR lim= 30 | 3G:ACLR1 lim= 33 | 3G:ACLR2 lim= 36 | EVM (dB) lim= 18.1 | Adj. RB lim= 21.1 | $P_{sat} - P_{out}$ |
|---|---|---|---|---|---|---|---|
| 100 | 18 | 36.0 | 33.3 | 57.8 | 23.9 | 22.2 | 2.2 |

| Channel BW (RB) | Allocated BW (RB) | LTE: ACLR lim= 30 | 3G:ACLR1 lim= 33 | 3G:ACLR2 lim= 36 | EVM (dB) lim= 15.1 | Adj. RB lim= 21.1 | $P_{sat} - P_{out}$ |
|---|---|---|---|---|---|---|---|
| 100 | 18 | 38.9 | 36.6 | 58.2 | 17.2 | 19.5 | 1.5 |
| 75 | 16 | 37.0 | 35.7 | 58.3 | 17.0 | 19.7 | 1.5 |
| 50 | 12 | 36.0 | 36.4 | 61.4 | 17.1 | 19.5 | 1.5 |
| 25 | 8 | 33.6 | 37.1 | 58.7 | 17.0 | 20.2 | 1.5 |
| 15 | 4 | 34.6 | 40.9 | n/a | 17.1 | 21.4 | 1.5 |
| 6 | 1 | 36.3 | 38.4 | n/a | 16.7 | 25.3 | 1.5 |

600 / 602 / 604 / 606 / 608

| Channel BW (RB) | Allocated BW (RB) | LTE: ACLR lim=30 | 3G:ACLR1 lim=33 | 3G:ACLR2 lim=36 | EVM (dB) lim=18.1 | Adj. RB lim=21.1 | $P_{sat} - P_{out}$ |
|---|---|---|---|---|---|---|---|
| 100 | 18 | 40.1 | 37.3 | 60.3 | 18.6 | 21.1 | 2.5 |
| 75 | 16 | 38.2 | 36.8 | 60.5 | 18.5 | 21.4 | 2.5 |
| 50 | 12 | 37.0 | 37.4 | 61.5 | 18.3 | 21.6 | 2.5 |
| 25 | 8 | 34.1 | 38.1 | 57.8 | 18.8 | 21.6 | 2.5 |
| 15 | 4 | 35.0 | 41.8 | n/a | 18.7 | 22.5 | 2.5 |
| 6 | 1 | 37.6 | 40.0 | n/a | 18.3 | 26.8 | 2.5 |

SYSTEM AND METHOD OF IMPROVING POWER EFFICIENCY IN WIRELESS COMMUNICATION SYSTEM

BACKGROUND

Single-carrier frequency division multiple access (SC-FDMA) is a frequency-division multiple access scheme. Like other multiple access schemes (TDMA, FDMA, CDMA, OFDMA), multiple users are assigned to a shared communication resource. As in Orthogonal Frequency-Division Multiple Access (OFDMA) systems using Orthogonal Frequency-Division Multiplexing (OFDM) techniques, guard intervals with cyclic repetition are introduced between blocks of symbols in view to efficiently eliminate time spreading (caused by multi-path propagation) among the blocks.

Unlike OFDMA systems, in SC-FDMA, data symbols are transmitted sequentially. The modulation symbols are spread so that each subcarrier is carrying a part of each modulation symbol. The SC-FDMA symbol period is the same length as the OFDMA symbol but due to sequential transmission, the data symbols in SC-FDMA are shorter. The symbols occupy one OFDM symbol period divided by the number of sub-carriers. A consequence of the higher data rate symbols is that greater SC-FDMA signal generation bandwidth is required, so each data symbol occupies bandwidth corresponding to the number of sub-carriers times the OFDM bandwidth.

Multiple access among users is made possible by assigning to different users different sets of non-overlapping Fourier-coefficients (sub-carriers). This is achieved in known SC-FDMA schemes at the transmitter by inserting, prior to inverse Fast Fourier Transform (IFFT) processing, silent Fourier-coefficients (at positions assigned to other users), and removing them on the receiver side after the FFT.

A feature of SC-FDMA is that it leads to a single-carrier transmit signal, in contrast to OFDMA, which is a multi-carrier transmission scheme. Owing to its inherent single carrier structure, a prominent advantage of SC-FDMA over OFDM and OFDMA is that its transmit signal has a lower peak-to-average power ratio (PAPR). This is due in part to the fact that while in OFDM the transmit symbols directly modulate the multiple sub-carriers, in SC-FDMA the transmit symbols are first preprocessed by a DFT block.

During signal transmission using both OFDMA or SC-FDMA, out-of band emission represents a challenge. The out-of-band emission refers to signal power leakage out of the desired signal bandwidth, and is due to factors such as imperfections in transmit and receive filters. Moreover, the non-linearity of a power amplifier (PA), which causes distortion of the waveform during the conversion of a low power radio frequency (RF) signal into a high power RF signal, may also result in unwanted spectral emission into an adjacent frequency band. Because SC-FDMA may have a lower PAPR compared to OFDMA, the power amplifier backoff required to preserve linearity may be less. Thus, SC-FDMA has attracted interest as an attractive alternative to OFDMA, especially in the uplink communications where lower PAPR greatly benefits the mobile terminal, or user equipment (UE), in terms of transmit power efficiency and terminal costs. It is currently the designated technology for uplink multiple access schemes in 3GPP Long Term Evolution (LTE), or Evolved Universal Terrestrial Radio Access (E-UTRA), and for uplink wireless transmission in future mobile communication systems where transmitter power efficiency is of paramount importance.

For UE transmitters used to transmit SC-FDMA signals, it may therefore be desirable to reduce the PAPR while still meeting in-band signal requirements imposed by the LTE standard. Known techniques for reducing the PAPR of the baseband (BB) signal include a digital "clipping" (which may involve limiting magnitude of the signal samples while preserving their phases) process, followed by processing using a digital low pass filter (LPF) to suppress the spectral leaks resulting from the clipping. However, the LPF filtering may have the adverse effect of increasing the peak magnitude, and consequently, the PAPR, of the signal, thereby reversing at least part of the PAPR reduction done by the clipping. It is with respect to these and other considerations that the present improvements have been needed.

DETAILED DESCRIPTION

Various embodiments may be generally directed to systems that employ wireless communications using frequency division multiplexing. Some embodiments may be particularly directed to architecture and methods for improving transmit power efficiency in frequency division multiplexing systems, such as SC-FDMA.

Various embodiments may comprise one or more elements. An element may comprise any structure arranged to perform certain operations. Although an embodiment may be described with a limited number of elements in a certain arrangement by way of example, the embodiment may include more or less elements in alternate arrangement as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Figure 1:
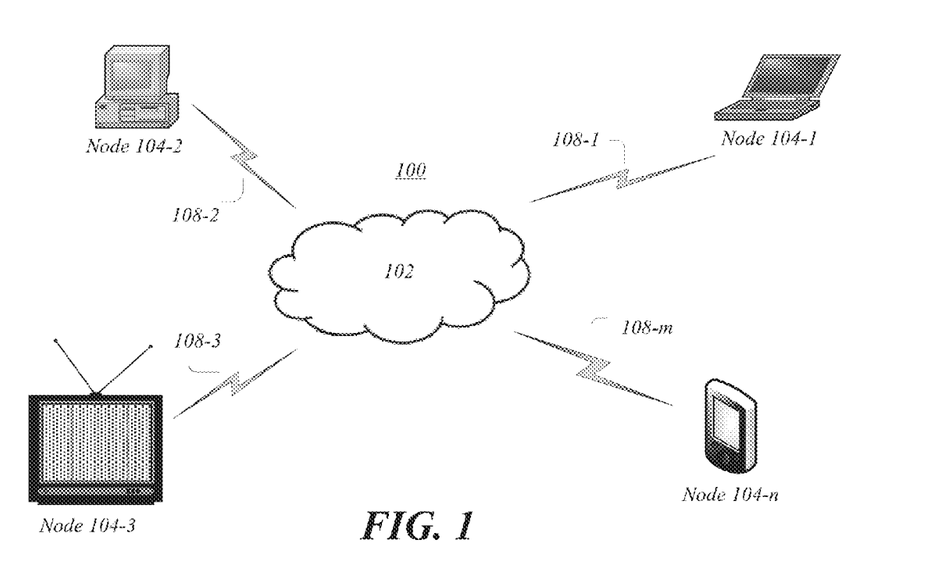
FIG. 1 illustrates one embodiment of a communications system.

FIG. 1 illustrates a block diagram of one embodiment of a communications system 100 that may include embodiments of the channel estimation architecture disclosed herein. As shown in FIG. 1, the communications system 100 may comprise a network 102 that communicates over links 108-$m$ with a plurality of nodes 104-$n$, where m and n may represent any positive integer values. In various embodiments, the nodes 104-$n$ may be implemented as various types of wireless devices. Examples of wireless devices may include, without limitation, a station, a subscriber station, a base station, a wireless access point (AP), a wireless client device, a wireless station (STA), a laptop computer, ultra-laptop computer, portable computer, personal computer (PC), notebook PC, handheld computer, personal digital assistant (PDA), cellular telephone, combination cellular telephone/PDA, smartphone, tablet computer, pager, messaging device, media player, digital music player, set-top box (STB), appliance, workstation, user terminal, mobile unit, consumer electronics, television, digital television, high-definition television, television receiver, high-definition television receiver, and so forth.

In some embodiments, a multiplicity of devices in communications system 100 may employ one or more standards for communicating between a receiver and transmitter. Some embodiments of a communications system may be implemented with a radio technology such as the Institute of Electrical and Electronics Engineers (IEEE) 802.16 (Wi-MAX), IEEE 802-20, Evolved Universal Terrestrial Radio Access (E-UTRA), and so forth. IEEE 802.16m is an evolution of IEEE 802.16e, and provides backward compatibility with an IEEE 802.16-based system. The E-UTRA is a part of a universal mobile telecommunication system (UMTS). Third ($3^{rd}$) generation partnership project (3GPP) long term evolution (LTE) is a part of an Evolved UMTS (E-UMTS) using the E-UTRA. LTE-advance (LTE-A) is an evolution of the 3GPP LTE. However, other embodiments may employ other standards, such as those noted above and/or those generally known to those of skill in the art.

Figure 2:
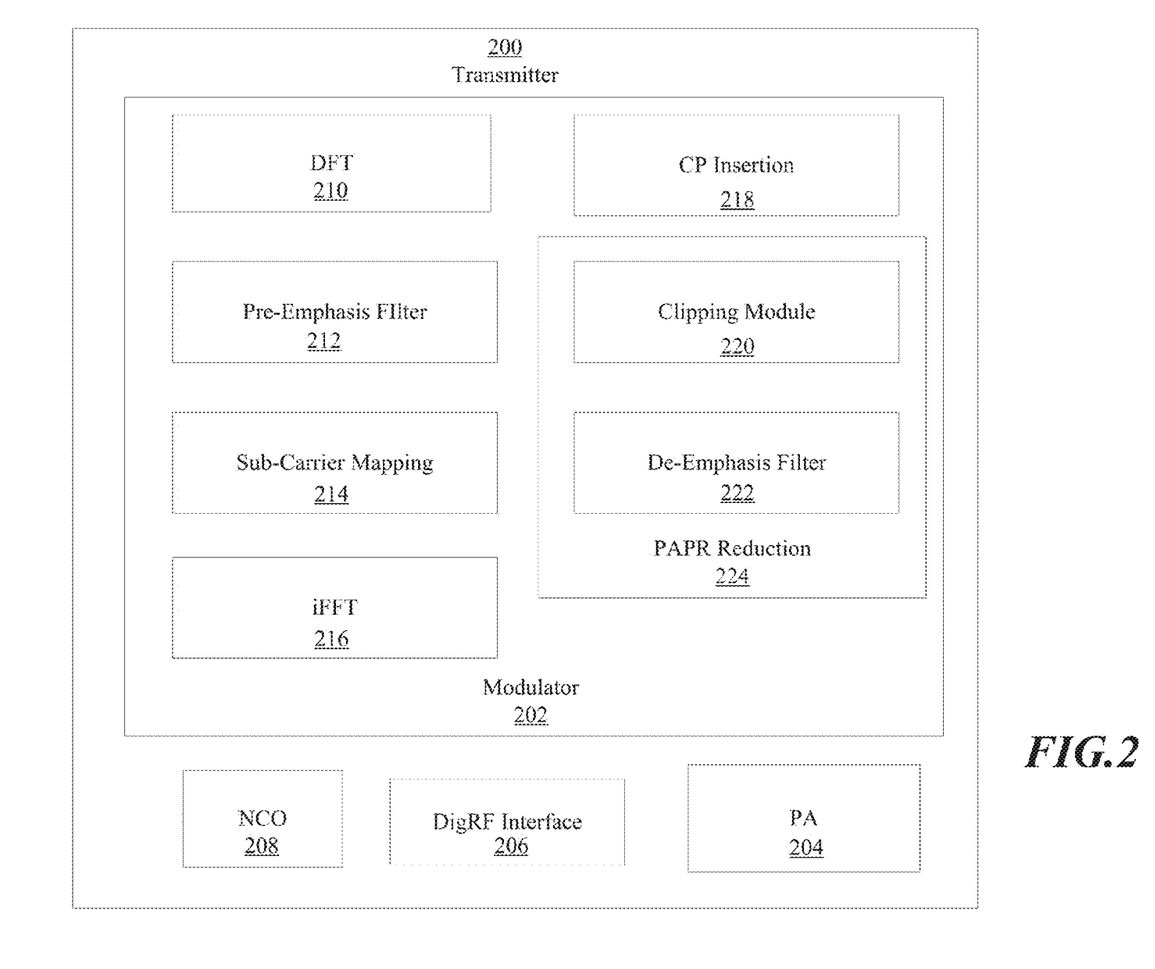
FIG. 2 is a block diagram illustrating an example embodiment of a transmitter in accordance with various embodiments.

FIG. 2 is a block diagram illustrating an example embodiment of a transmitter 200 in accordance with various embodiments. As illustrated, for various embodiments, a transmitter 200 may include a modulator 202, a power amplifier 204, a digital RF interface 206 and numerically controlled oscillator 208. In various embodiments, the digital RF interface 206 may comprise a digital interface between an RF transceiver (not separately depicted) and a digital baseband controller (also not shown), as known to those of skill in the art. In various embodiments, the modulator 202 may act as an SC-FDMA modulator for modulating a signal carrying data symbols to be transmitted by transmitter 200. In some embodiments, the modulator 202 may perform in conjunction with power amplifier 204 to provide better power efficiency to transmitter 200, while preserving sampling rate and signal quality.

Although the components shown in FIG. 2 are depicted as separate blocks within the transmitter 200, the functions performed by some of these blocks may be integrated within a single semiconductor circuit or may be further subdivided into more separate integrated circuits.

In various embodiments, the transmitter 200 may convert a binary input signal to a sequence of modulated subcarriers. To do so, at an input to transmitter 200 may transform binary input to a multilevel sequence of complex numbers $X_n$ in one of several possible modulation formats including Binary Phase Shift Keying (BPSK), quaternary PSK (QPSK), 16-level Quadrature Amplitude Modulation (16-QAM) and 64-QAM. The transmitter may adapt the modulation format, and thereby the transmission bit rate, to match the current channel conditions of a terminal containing the transmitter. The transmitter 200 may next group the modulation symbols into blocks each containing N symbols. The SC-FDMA subcarriers may be modulated using an N-point discrete Fourier transform (DFT) block 210, to produce a frequency domain representation of the input symbols.

In various embodiments, the modulator 202 may further include a pre-emphasis filter 212, a signal mapper, such as a sub-carrier mapping module 214, an inverse Fast Fourier transform (iFFT) module 216, a clipping module 220, and a cyclic prefix (CP) insertion module 218. The modulator may further include a PAPR reduction module 224 that contains a clipping module 220 and a de-emphasis filter 222. In various embodiments, pre-emphasis filter 212 may be coupled to the clipping module 220 through sub-modules of modulator 202. In some embodiments, the pre-emphasis filter 212 may be coupled to the clipping unit 220 through sub-carrier mapping module 214, iFFT module 216, and CP insertion module 218.

In some embodiments, pre-emphasis filter 212 is arranged to receive the (frequency domain) output signal from DFT 210 and to apply a distortion, such as by multiplying the signal by an inverse frequency response of a sliding average filter, where the sliding average interval may be a convenient size. The sliding average interval may be based upon, for example, the transmission (Tx) bandwidth, and in particular, may be inversely proportional to the Tx bandwidth.

In various embodiments, the pre-emphasized frequency domain signal is forwarded to sub-carrier mapping module 214. The pre-emphasized frequency domain signal may be mapped onto sub-carriers that are symmetrically distributed around DC. The spacing of sub-carriers may be about 10-20 kHz, for example, 15 kHz in some embodiments. The carriers may be mapped consecutively, for example in 12 consecutive sub-carriers that are symmetrically distributed about DC.

In various embodiments, mapped subcarrier signals that are forwarded to iFFT module 216 and CP insertion module 218, may be processed by clipping module 220. The clipping module 220 may limit the magnitude of the signal samples to a pre-determined threshold based on the ratio of instant signal magnitude to its RMS value. Resultantly, after clipping of the signal, the signal may have a pre-determined PAPR. In various embodiments, this pre-determined PAPR may be adjusted accordingly. To limit magnitude of a complex sample while preserving its phase, the clipping module 220 may use any algorithm, e.g Coordinate Rotation Digital Computer (CORDIC). The clipping module 220 may thereby reduce PAPR of the signal, while at the same time introducing out-of-band emission. In accordance with some embodiments, de-emphasis filter (module) 222 is arranged to compute the sliding average of the signal (where averaging length may be inversely proportional to the allocated bandwidth, as previously noted). In some embodiments the de-emphasis module may be a cascaded integrator comb (CIC) filter. The de-emphasis module 222 may reduce out-of-band emission caused by the clipping module 220. Although the de-emphasis process may increase the PAPR slightly, this PAPR increase may be negligible, or tolerable, due to impulse response (IR) of the de-emphasis module 220 being much shorter than that of a low pass filter. The de-emphasis module 220 may have a Frequency Response (FR) with near null values at the critical frequencies, thereby minimizing out-of-band emission at about critical offsets from a carrier frequency.

After filtering by the de-emphasis module 222, the signal may have a reduced value. In accordance with some embodiments, the clipping level applied by clipping module 220 and the averaging length applied by de-emphasis module 222 may be optimized to reduce PA backoff by about 0.7 dB. This may entail, for example, applying clipping levels in the range of about 1.5 dB to about 2.0 dB or so, depending on the QAM or QPSK signal being processed.

After filtering with a de-emphasis filter 222, the signal may be upconverted to shift the de-emphasized signal in frequency to its allocated frequency range. In various embodiments, a numerically controlled oscillator 208 may be used to upconvert the de-emphasized signal.

Figure 3A:
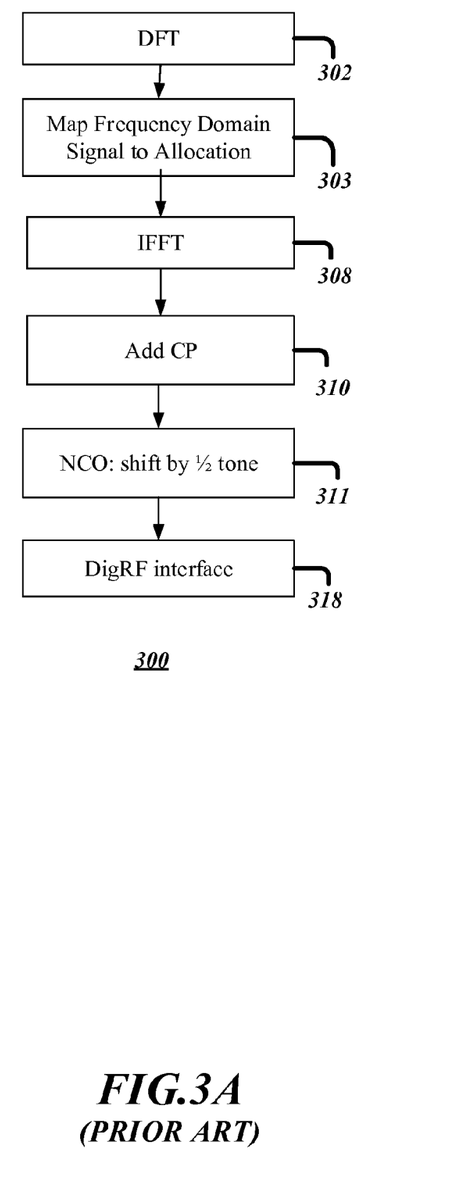
FIG. 3A illustrates a known SC-FDMA method.
Figure 3B:
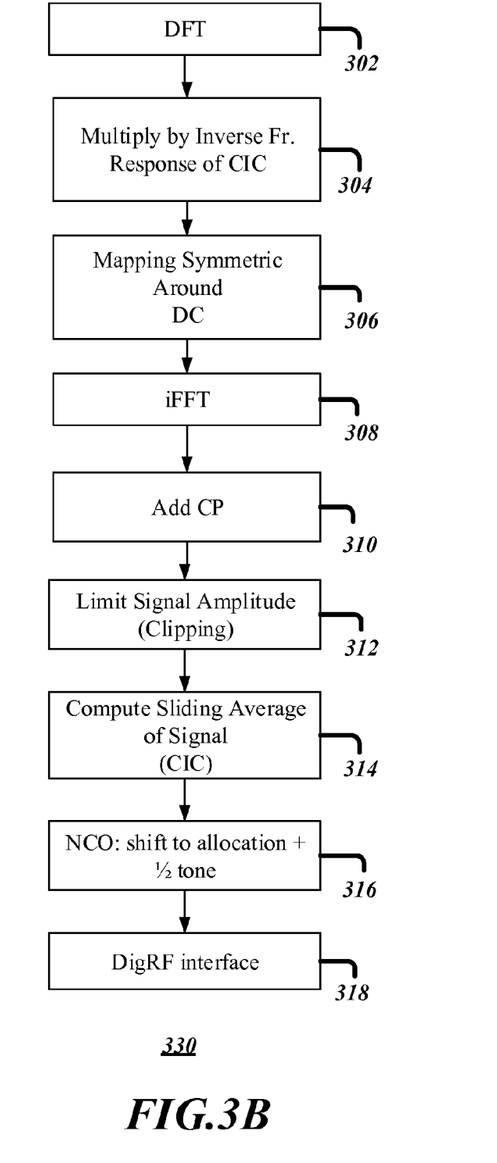
FIG. 3B illustrates a method according to some embodiments.

FIGS. 3A, 3B compare a known SC-FDMA modulator sequence 300 with a method 330 of improving power efficiency in accordance with some embodiments.

Turning to FIG. 3A, in the known sequence at block 302, a discrete Fourier transform (DFT) is applied to a time domain signal. This operation leads to a frequency domain signal over a fixed number of sub-carriers that are spaced apart by a given spacing, such as 15 kHz. In SC-FDMA, the DFT is used to multiplex uplink transmissions of multiple transmitters in specific frequency allocation blocks within the overall system bandwidth according to scheduler instructions. In particular, the time domain signal may represent a set of data symbols to be mapped for transmission over the SC-FDMA transmitter. The DFT operates to transform the time domain signal into a frequency domain signal.

At block 303, the sub-carriers are shifted to the desired allocation within a system bandwidth. At block 308, the frequency domain signal is transformed back to a time domain signal by an IFFT process. In the known SC-FDMA sequence, a cyclic prefix is added at block 310. At block 311, the signal is shifted by half (½) tone. In known systems this may be performed using a numerically controlled oscillator (NCO). At block 318, the signal is forwarded to a digital RF interface.

Turning now to FIG. 3B, in various embodiments, the method 330 begins at block 302, where the discrete Fourier transform (DFT) is applied to a time domain signal. In some embodiments the DFT operation may combine multiple QPSK or QAM symbols to form an SC-FDMA symbol. For purposes of illustration, using an example of 4 sub-carriers where the bandwidth in the time domain is 15 kHz, each SC-FDMA symbol is spread over 4×15 kHz (60 kHz) frequency bandwidth for quarter (¼) SC-FDMA periods.

In contrast to the known method 300, before sub-carrier mapping takes place, the frequency domain signal is subjected to "pre-emphasis," as illustrated at block 304. The pre-emphasis may entail multiplying the frequency domain signal by an inverse frequency response of a sliding (moving) average filter, such as a cascade integrator-comb (CIC) filter. However, in other embodiments, other types of moving average filters may be applied to perform the pre-emphasis. In various embodiments the pre-emphasized signal may be distorted to resemble any shape or form, so long as the spectrum of the transmitted signal is properly shaped after de-emphasis.

At block 306, the pre-emphasized signal is mapped symmetrically about DC. At block 308, the frequency domain signal is transformed back to a time domain signal by an IFFT process. At block 310, a cyclic prefix is added. This process may restore the useful symbol length of each symbol by copying the end of the symbol to the start.

At block 312, the pre-emphasized signal is subject to clipping. In one embodiment, a clipping operation may limit signal magnitude (amplitude) to a pre-determined threshold based on the ratio of instant signal magnitude to its RMS value. The clipping operation may be arranged to produce a pre-determined PAPR for the pre-emphasized signal after clipping. In contrast to the method 300, which does not clip the time domain signal, the clipping operation may introduce one or more out-of-band spectral components.

At block 314, the clipped signal is subject to de-emphasis by computing the sliding average of the signal. In some embodiments, this is performed using a CIC filter. The averaging length employed in this computation may be inversely proportional to the allocated bandwidth (BW) for the signal. Thus, for relatively larger BW, the averaging length is relatively smaller. In various embodiments, the optimum averaging length to be employed at block 314 may be determined empirically. The averaging length to be employed may depend, for example, on the level of clipping employed at block 312. For example, it may be desirable to minimize the level of backoff to be applied to a power amplifier of the SC-FDMA transmitter while still producing signals of acceptable quality. For changes in a given clipping level, the in band and out of band quality, such as adjacent channel leakage ratio (ACLR) and error vector magnitude (EVM), may change. Thus, increasing the clipping level may lead to lower PAPR, but may increase out of band emission, leading to higher ACLR, for example. On the other hand, once the de-emphasis is performed at block 314, the out-of-band-emission may be reduced, while the resultant PAPR may exhibit a slight increase. However, with properly chosen clipping level and averaging length for de-emphasis, in various embodiments the PAPR may be reduced sufficiently for the back-off in a power amplifier to be reduced by up to about 0.7 dB, as previously noted and detailed further in the discussion to follow.

At block 316, the de-emphasized signal is shifted (upconverted) to its allocated frequency and forward to a digital RF interface at block 318. This may be performed by a numerically controlled oscillator which upconverts the de-emphasized BB signal to its RF band.

In summary, methods and apparatus of various embodiments treat a digital SC-FDMA signal to reduce PAPR using a sequence of pre-emphasis-clipping-de-emphasis, in which the pre-emphasis is performed in the frequency domain. The frequency domain SC-FDMA signal is mapped symmetrically around DC before PAPR reduction, and shifted to its proper frequency allocation only after PAPR reduction.

In this manner, the processed signal may meet LTE in-band requirements for signal quality, and may be processed at IFFT sampling rates. For example, the LTE standard specifies a maximum or desired EVM. The error vector magnitude represents the size of an error vector, which may be a vector in the I-Q plane between an ideal constellation point and the actual point received by the receiver. In other words, the error vector may represent the difference between actual received symbols and ideal symbols. The out of band quality may be measured by quantities such as ACLR, which characterizes the ratio of mean power in an assigned channel to that in an adjacent channel. In some embodiments, the ratio of EVM and ACLR may be tailored to be a large value, while still maintaining EVM within acceptable limits, as defined, for example, in the given LTE standard. For example, referring again to FIG. 2, the transmitter 200 may be operated in a manner that reduces the power backoff of PA 204 until an EVM limit is approached. In this manner, the PA backoff may be reduced up to 0.7 dB in some embodiments while still complying with LTE EVM requirements. In some embodiments the ratio of EVM/ACLR may be about 20, while the EVM is maintained near a specified EVM limit.

In order to take advantage of embodiments of an SC-FDMA modulator, the operation of various components of a modulator may be modified to determine their effect on LTE parameters.

Figure 4:
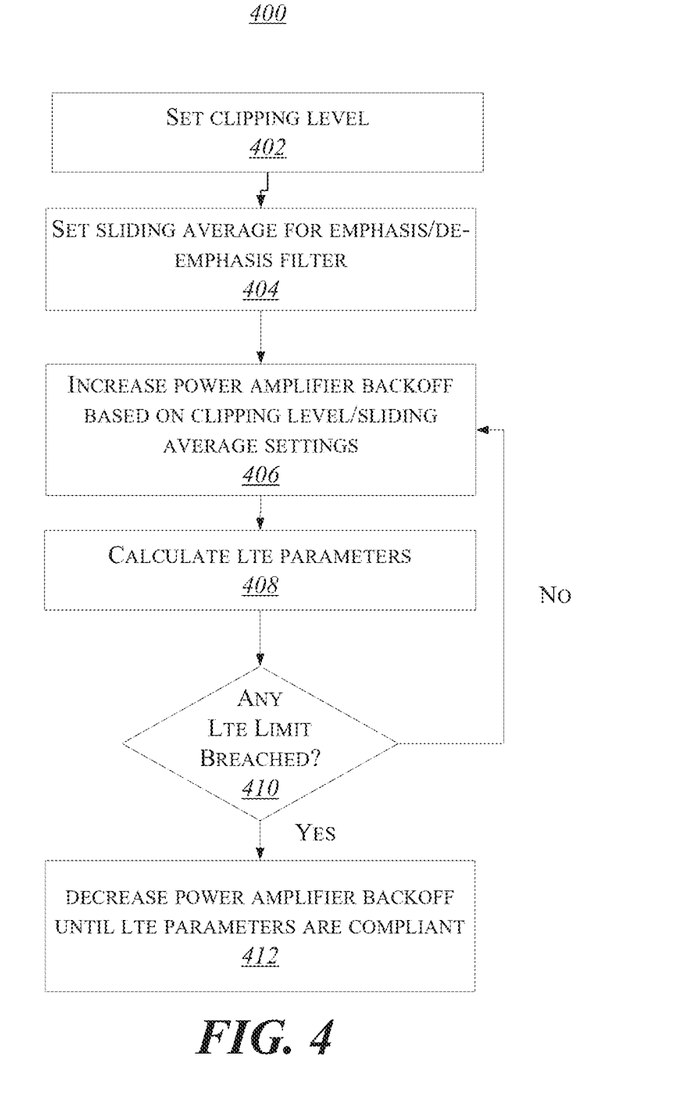
FIG. 4 depicts an exemplary method for adjusting PA operation.

FIG. 4 depicts an exemplary method for adjusting PA operation, which may be performed as a simulation. At block 402, a clipping level is set, which may set the maximum signal amplitude of a pre-emphasized time domain signal. At block 404, the sliding average for an emphasis/de-emphasis filter is set. At block 406, once the modulator properties such as clipping level and size for sliding average are established, the backoff of a power amplifier is increased. At block 408, properties of the transmitter, such as LTE parameters, are calculated based on the power amplifier backoff. Exemplary parameters may include EVM, ACLR, and/or other parameters. At block 410, if any LTE limit is breached, the method proceeds to block 412 where the power amplifier backoff is decreased until the calculated LTE parameters are compliant. If, at block 410, no limits are breached, the method proceeds to block 406, where the power amplifier backoff may be increased.

Figure 5:
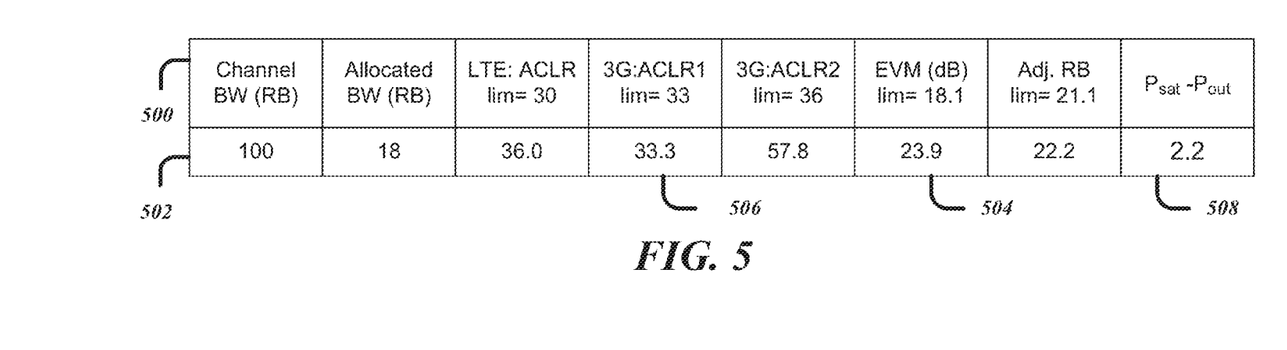
FIG. 5 depicts baseline simulated measurements of a signal processed in an SC-FDMA modulator.
Figure 6A:
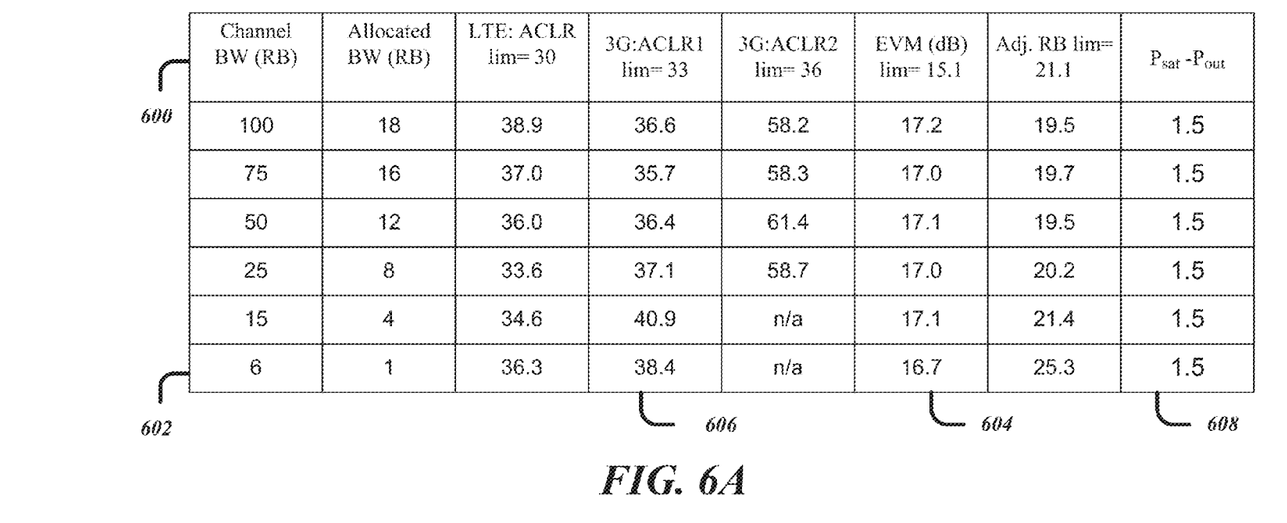
FIGS. 6A, 6B depict measurements in accordance with embodiments of an SC-FDMA modulator.
Figure 6B:
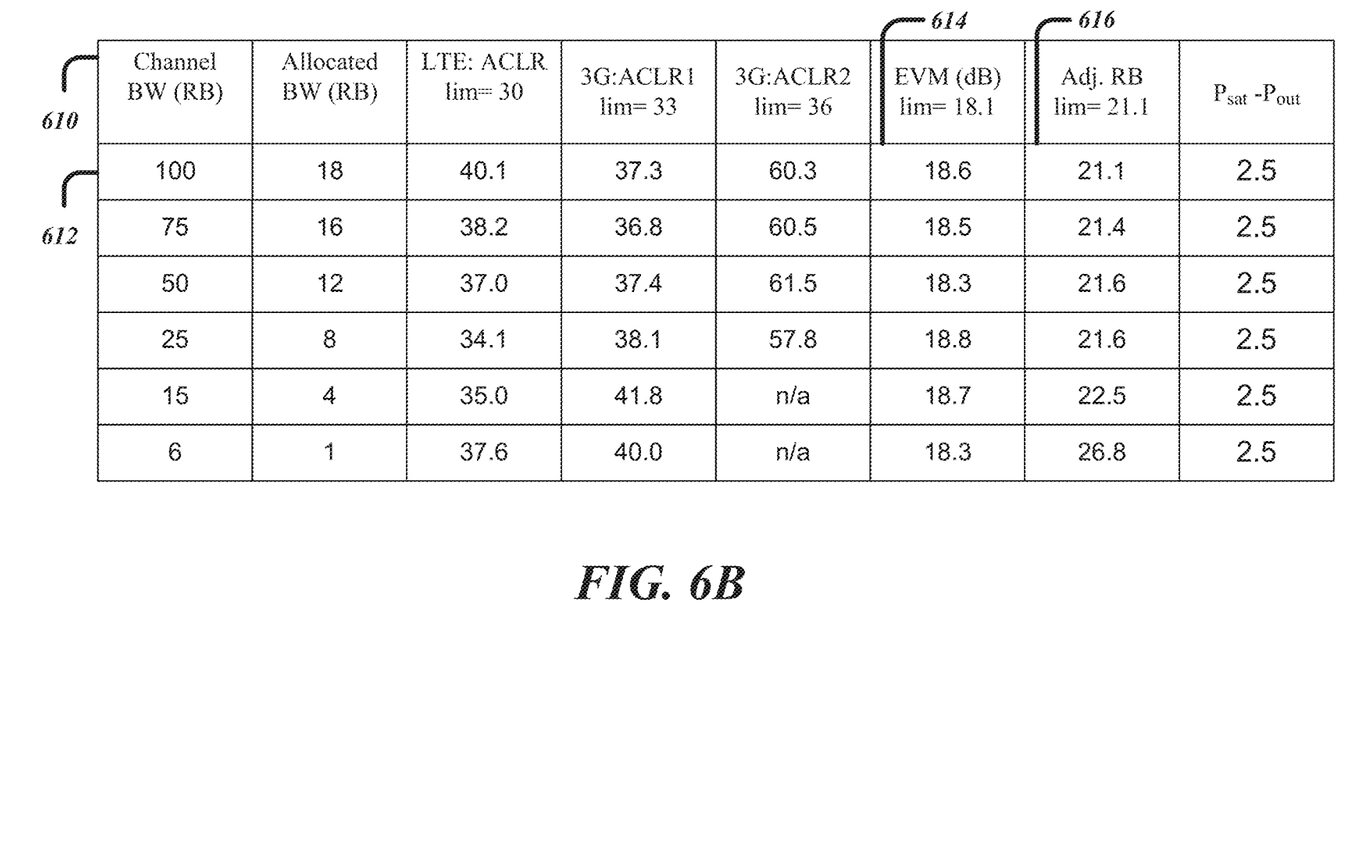

To highlight operation of the method 400, FIGS. 5 and 6A, 6B illustrate baseline signal measurements and exemplary signal measurements consistent with the method 400, respectively. The signal measurements represent two different type of modulation techniques commonly used in UE transmitters. In SC-FDMA technology, in the uplink, the data may typically be mapped onto a signal constellation using either QPSK and QAM, such as 16QAM or 64 QAM, depending on the quality. Both these techniques are represented by the data shown in FIGS. 5 and 6A, 6B.

FIG. 5 depicts baseline simulated measurements of a signal processed in an SC-FDMA modulator. As shown in FIG. 5, a data structure 500 illustrates a baseline case that lists multiple quality parameters that represent simulated measurements of a QPSK-narrow signal for transmitter operation without use of a PAPR (no signal emphasis and clipping) module. Various parameters are shown for a channel bandwidth (BW) parameter 502 of 100 resource blocks (RB) and an allocated bandwidth of 18 RB. The ALCR1 parameter 506 has a value of 33.3, while the specified limit is 33. The calculated EVM level 504 is 23.9 dB, while the specified limit is 18 dB. For this set of conditions, the PA backoff ($P_{SAT}$-$P_{OUT}$) 508 employed is 2.2 dB. In order to assess the benefits of the PAPR process according to the present embodiments, the PA backoff was reduced in this case (no PAPR module) to the point at which one or more LTE limit(s) was approached. In the example of FIG. 5, the ALCR1 value of 33.3 is very close to the limit of 33. Accordingly, the PA backoff of 2.2 dB may be deemed a baseline for the case of QPSK-narrow signal processing.

FIG. 6A depicts corresponding values for processing a QPSK-narrow signal according to embodiments of a transmitter that employ a PAPR process. The data structure 600 includes multiple rows corresponding to different channel bandwidth and allocated bandwidth. The channel bandwidth and allocated bandwidth for the various test results are again expressed in terms of resource blocks. For clarity, as expressed in MHz, each resource block may be 12 subcarriers that are spaced at 15 kHz intervals, leading to 180 kHz bandwidth per resource block. Thus, the 100 RB BW case may correspond to 18 MHz, while the 6 RB BW case corresponds to 1.08 MHz. At each different bandwidth, the corresponding ACLR and EVM values are shown. In particular, the ACLR1 values represent the ACLR value based on the adjacent channel leakage of the immediately adjacent channel to the carrier channels, while the ACLR2 values represent ACLR based on the second adjacent channel, that is, a channel next to the immediately adjacent channel but not immediately adjacent to the carriers.

In the PAPR process employed to produce the values displayed in FIG. 6a, the QPSK signal is clipped at a level of 1.23 rms (1.8 dB), and the sliding average interval employed for emphasis module is 1.3/(Tx bandwidth). As with the case in FIG. 5, the PA backoff was decreased until LTE limit(s) were approached.

As illustrated, the transmitter PA backoff 608 is reduced to 1.5 dB without breach of any LTE limit. For example, as a function of channel bandwidth, the ACLR values fluctuate somewhat between about 34 and 39, but do not approach the LTE limit of 30. Similarly, the ACLR1 values fluctuate between about 36 and 41, but do not approach the limit of 33. The ACLR2 values remain well above the limit of 36. The EVM values, on the other hand, are closer to the specified limit. The EVM level 604 is 16.7 dB for 6 RB channel bandwidth, which EVM value approaches the limit of 15.1. Thus, for QPSK-narrow signals the embodiment of FIG. 6a permits a decrease in the PA backoff from 2.2 dB for the baseline case of FIG. 5 to 1.5 dB, while still maintaining the EVM value within an acceptable range, albeit closer to the specified limit than in the baseline case. The resultant improvement of 0.7 dB in PA backoff is obtained with minimal penalty to be paid in other aspects of transmitter performance.

Similar signal measurements consistent with the method 400 may be performed for other modulation schemes of SC-FDMA transmitters.

FIG. 6B depicts corresponding test measurement values for processing a QAM16-narrow signal according to embodiments of a transmitter that employ a PAPR process. Similarly to FIG. 6a, the data structure 610 includes multiple rows corresponding to different channel bandwidth and allocated bandwidth. In this case the power backoff of 2.5 dB was reduced from a higher level in a baseline case employed without PAPR reduction. As illustrated, the ACLR, ACLR1, and ACLR2 test measurements all fluctuate about values that do not approach their respective limits. The EVM values (18.3 dB-18.8 dB), on the other hand, are closer to the specified limit of 18.1 dB. In particular, the row of values 612 for 100 RB channel width includes test measurements that approach the respective limits for more than one signal quality criterion. The EVM test measurement 614 is 18.6 dB as compared to the specified limit of 18.1 dB. Moreover, the test measurement values for adjacent resource block 616 decrease with increasing channel bandwidth, and at a bandwidth corresponding to 100 RB, the value for adjacent resource block test measurement 616 coincides with the specified limit of 21.1.

It is to be noted that the results displayed in FIGS. 6a and 6b are merely exemplary, and that the signal quality criteria may vary differently with different combinations of clipping level applied to a clipping module and sliding average interval applied to a de-emphasis filter. Thus, other combinations in which the clipping level dB value is higher or lower than 1.8 dB may lead to different PA backoff levels consistent with specified signal quality limits, such as LTE limits. Similarly, combinations that employ different sliding average intervals may affect the amount of PA backoff that can be applied to the transmitter while still conforming to signal quality limits.

Figure 7:
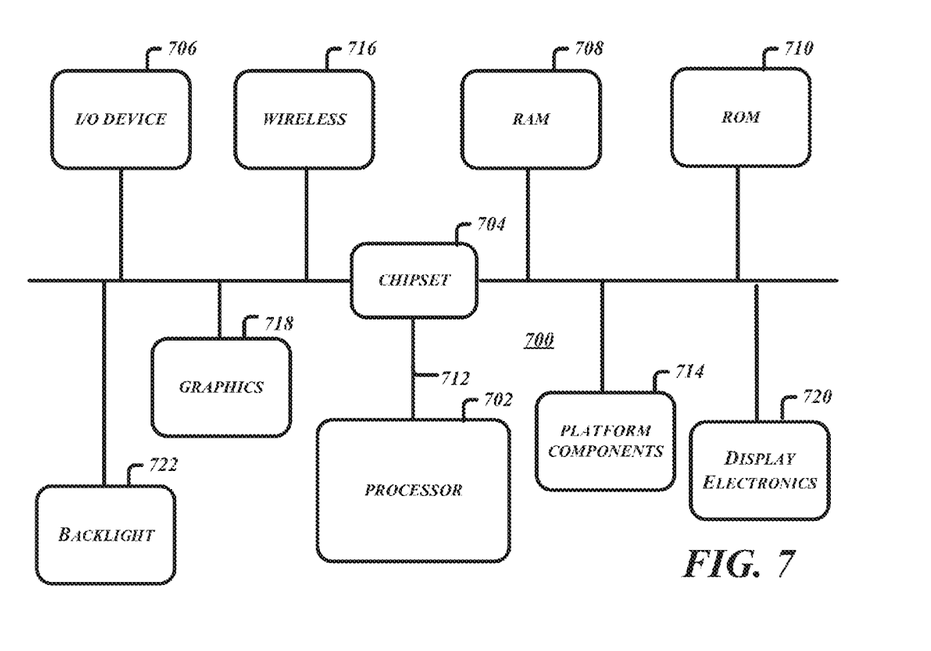
FIG. 7 is a diagram of an exemplary system embodiment.

FIG. 7 is a diagram of an exemplary system embodiment. In particular, FIG. 7 is a diagram showing a platform 700, which may include various elements. For instance, FIG. 7 shows that platform (system) 700 may include a processor 702, a chipset 704, an input/output (I/O) device 706, a random access memory (RAM) (such as dynamic RAM (DRAM)) 708, and a read only memory (ROM) 710, display electronics 720, display backlight 722, and various other platform components 714 (e.g., a fan, a crossflow blower, a heat sink, DTM system, cooling system, housing, vents, and so forth). System 700 may also include wireless communications chip 716 and graphics device 718. The embodiments, however, are not limited to these elements.

As shown in FIG. 7, I/O device 706, RAM 708, and ROM 710 are coupled to processor 702 by way of chipset 704.

Chipset 704 may be coupled to processor 702 by a bus 712. Accordingly, bus 712 may include multiple lines.

Processor 702 may be a central processing unit comprising one or more processor cores and may include any number of processors having any number of processor cores. The processor 702 may include any type of processing unit, such as, for example, CPU, multi-processing unit, a reduced instruction set computer (RISC), a processor that have a pipeline, a complex instruction set computer (CISC), digital signal processor (DSP), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A transmitter of a communications system, comprising:
   a discrete Fourier transform (DFT) module arranged to:
      receive a time domain signal comprising a set of modulated data symbols; and
      apply a DFT to the time domain signal to generate a frequency domain signal comprising a set of single-carrier frequency domain multiple access (SC-FDMA) symbols;
   a digital pre-emphasis filter arranged to pre-emphasize the frequency domain signal;
   a signal mapper arranged to map the pre-emphasized frequency domain signal to sub-carriers of an SC-FDMA transmission bandwidth, the sub-carriers symmetrically distributed about direct current (DC) for the SC-FDMA transmission bandwidth;
   an inverse fast Fourier transform module to transform the mapped pre-emphasized frequency domain signal into a second time domain signal;
   a peak-to-average-power reduction (PAPR) module arranged to treat the second time domain signal so as to reduce PAPR in a transmit signal sent from the transmitter via the SC-FDMA transmission bandwidth; and
   an up-converter arranged to upconvert the second time domain signal to an allocated transmission band after the second time domain signal is treated by the PAPR reduction module.

2. The transmitter of claim 1, the PAPR reduction module comprising:
   a clipping module coupled to the digital pre-emphasis filter, and arranged to reduce a magnitude of components of the second time domain signal that are above a predefined threshold; and
   a de-emphasis filter coupled to the clipping module, arranged to reduce spectral leakages outside of the SC-FDMA transmission bandwidth caused by the clipping module, and to reverse the distortion caused by the digital pre-emphasis filter within the SC-FDMA transmission bandwidth.

3. The transmitter of claim 2, wherein the digital pre-emphasis filter is arranged to have an in-band portion of a frequency response of the digital pre-emphasis filter equal to a reverse function of an in-band portion of a frequency response of the de-emphasis filter.

4. The transmitter of claim 2, wherein the de-emphasis filter is a cascaded integral comb filter.

5. The transmitter of claim 1, wherein a frequency response of the digital pre-emphasis filter is based on a frequency response of the de-emphasis filter.

6. A method, comprising:
receiving a time domain signal comprising a set of modulated data symbols;
applying a discrete Fourier transform (DFT) to the time domain signal to generate a frequency domain signal comprising a set of single-carrier frequency domain multiple access (SC-FDMA) symbols;
pre-emphasizing the frequency domain signal;
mapping the pre-emphasized frequency domain signal to sub-carriers of an SC-FDMA transmission bandwidth, the sub-carriers symmetrically distributed about direct current (DC) for the SC-FDMA transmission bandwidth;
applying an inverse fast Fourier transform to transform the mapped pre-emphasized frequency domain signal into a second time domain signal;
reducing, in the second time domain signal, a magnitude of components that are above a predefined threshold;
reducing spectral leakages outside of the SC-FDMA transmission bandwidth caused by the reducing the magnitude of components; and
after reducing the spectral leakages, upconverting the second time domain signal to an allocated transmission band comprising the SC-FDMA transmission bandwidth.

7. The method of claim 6, comprising pre-emphasizing the frequency domain signal by applying a distortion to the frequency domain signal.

8. The method of claim 7, wherein the applying the distortion comprises multiplying the frequency domain signal by an inverse frequency response of a sliding average filter.

9. The method of claim 8, comprising computing a sliding average of the second time domain signal using a sliding average filter.

10. The method of claim 6, comprising reducing backoff in a power amplifier by reducing the magnitude of the components of the second time domain signal.

11. The method of claim 10, comprising reducing backoff in the power amplifier until an error vector magnitude limit corresponding to the set of modulated data symbols is reached.

12. An article of manufacture comprising a non-transitory computer-readable storage medium containing instructions that when executed by a processor enable a system to:
modulate a binary signal to generate a time domain signal comprising a set of modulated data symbols;
apply a discrete Fourier transform (DFT) to the time domain signal to generate a frequency domain signal comprising a set of single-carrier frequency domain multiple access (SC-FDMA) symbols;
pre-emphasize the frequency domain signal;
map the pre-emphasized frequency domain signal to sub-carriers of an SC-FDMA transmission bandwidth, the sub-carriers symmetrically distributed about direct current (DC) for the SC-FDMA transmission bandwidth;
apply an inverse fast Fourier transform to transform the mapped pre-emphasized frequency domain signal into a second time domain signal;
reduce, in the second time domain signal, a magnitude of components of that are above a predefined threshold;
reduce spectral leakages outside of the SC-FDMA transmission bandwidth caused by the reducing the magnitude of components; and
after reducing the spectral leakages, upconvert the second time domain signal to the SC-FDMA transmission bandwidth.

13. The article of manufacture of claim 12, the non-transitory computer-readable storage medium containing instructions that when executed by a processor enable the system to reduce backoff in a power amplifier by reducing the magnitude of the components of the second time domain signal.

14. The article of manufacture of claim 12, the non-transitory computer-readable storage medium containing instructions that when executed by a processor enable the system to:
multiply the frequency domain signal by an inverse frequency response of a sliding average filter; and
compute a sliding average of the second time domain signal using the sliding average filter.

* * * * *